Oct. 30, 1928.
S. J. NORDSTROM
1,689,799
VALVE
Filed Dec. 14, 1925
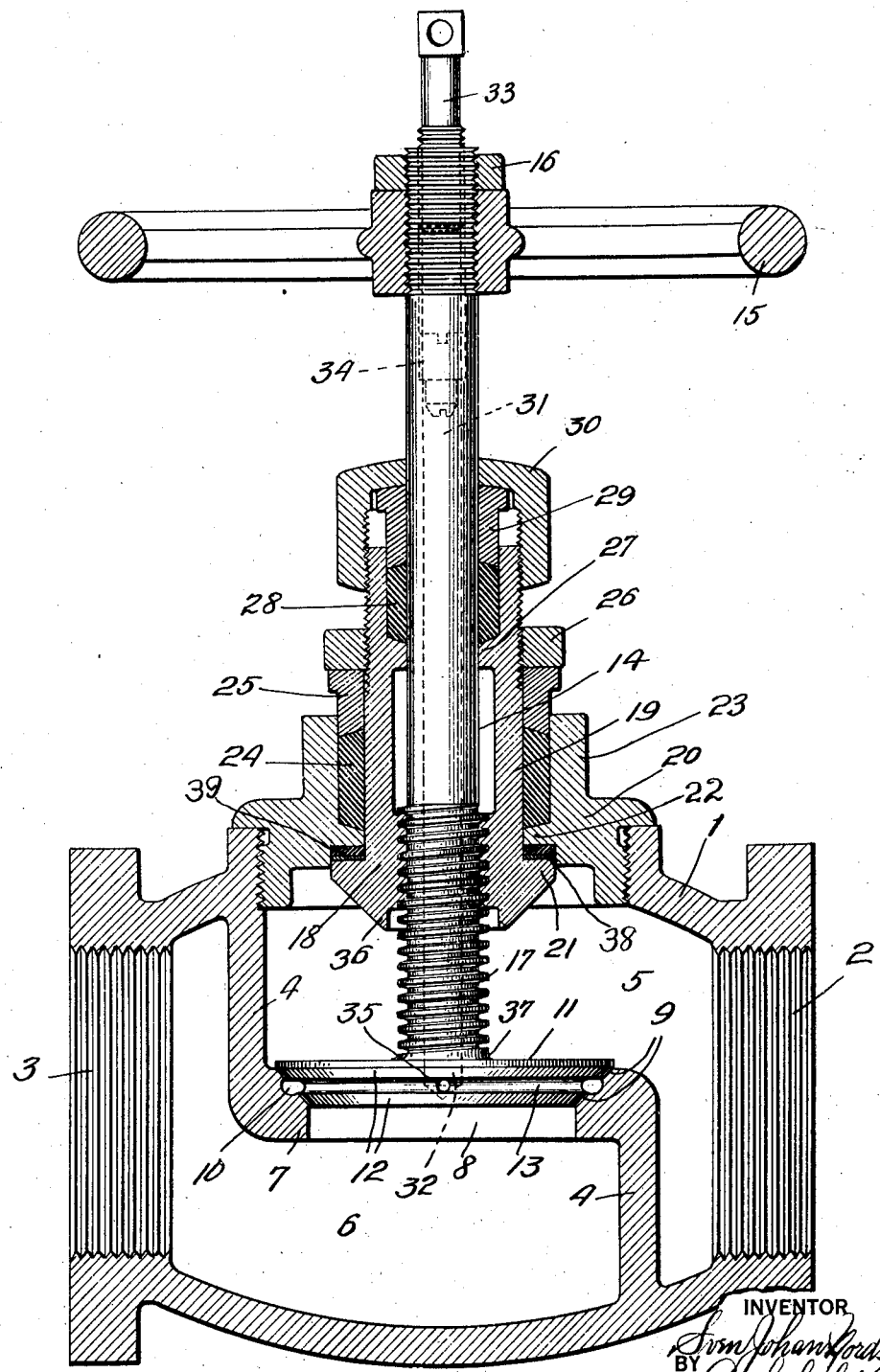
INVENTOR
Sven Johan Nordstrom
BY Archibald Cox
his ATTORNEY Patented Oct. 30, 1928.

1,689,799

UNITED STATES PATENT OFFICE.

SVEN JOHAN NORDSTROM, OF SARATOGA, CALIFORNIA, ASSIGNOR TO MERCO NORDSTROM VALVE COMPANY, OF SAN FRANCISCO, CALIFORNIA, A CORPORATION OF DELAWARE.

VALVE.

Application filed December 14, 1925. Serial No. 75,161.

The invention relates to an improvement in valves, and more particularly to an improvement in valves of the type commonly known as globe valves.

Valves of this type comprise a casing which is arranged longitudinally in the line to be controlled by the valve. The casing is divided by a web or partition into two chambers. In the middle of the web or partition is a hole, one edge of which is machined to serve as a valve seat. A flattened, disk-like plug having a machined periphery is adapted to seat against the annular seat formed in the partition to close the passageway through the casing. Connected with the center of the outer surface of the plug and extending outwardly through the casing is a valve stem provided with a threaded portion adapted to be received in a threaded member secured to the casing. The outer end of the stem is provided with a handle, by turning which the threaded stem is caused to travel in the threaded member and thereby move the plug toward and away from the valve seat. When the valve is in closed position with the plug engaging the valve seat the pressure of the fluid or liquid in the line tends to force the plug against its seat. For this reason globe valves have gone into extensive use. It so happens, however, that the fluid or liquid passing through the line sometimes contains grit or other foreign substance which is deposited upon the valve seat in the partition, so that when the disk or plug is screwed against the seat the bearing surfaces are scored, and this causes the valve to leak.

Heretofore when a globe valve has leaked, it has been necessary to shut off the flow of the fluid or liquid at its source and then dismantle the valve in order that it might be reground or lapped to make a tight joint. One object of the present invention is to produce a globe valve of such construction that the bearing surfaces between the valve seat and the disk or plug may be reground while the valve is in closed position and is subjected to the pressure of the fluid or liquid in the line. A further object of the invention is to provide a valve of this type with improved means whereby the seating surfaces may be lubricated and sealed with a suitable lubricant. To these ends one feature of the invention consists in the provision of means whereby when the valve stem is turned the plug is caused to rotate in contact with the valve seat, so that by introducing a plastic abrasive substance between the bearing surfaces a fresh tight joint may be formed between the plug and its seat. A further feature of the invention consists in so constructing the plug that it will serve as a reservoir to contain the abrasive substance which may also be used as the lubricant. The invention is more fully described hereinafter and is particularly pointed out in the appended claims.

In the accompanying drawing illustrating the preferred form of the invention, the figure is a longitudinal section through the improved globe valve. The valve, as illustrated, comprises a casing 1 which is roughly cylindrical in form and is provided at one end with an inlet 2 and at the other end with an outlet 3. In the casing is a web or partition wall 4 dividing the casing into the two chambers 5 and 6. The partition wall 4 is provided with a longitudinally extending part 7 which lies substantially in the middle of the casing and divides the chambers 5 and 6 equally. The middle part or section 7 of the partition 4 is pierced by the hole 8 to provide a passageway through the casing. The upper edge of the hole 8 is beveled at 9 to form an annular valve seat. In the valve seat 9 is an annular groove 10.

The movable member of the valve consists of a flattened plug or disk 11 having its lower edge 12 beveled in conformity with the beveled valve seat 9. In the beveled bearing surface 12 of the plug is an annular groove 13 corresponding to and located (in the closed position of the plug) opposite the annular groove 10 in the valve seat 9. Extending from the middle of the plug 11 and projecting outwardly from the casing is a valve stem 14, on the free end of which is threaded a wheel handle 15 which is secured to the valve stem by means of the check nut 16. The inner end of the valve stem is threaded at 17 and is received in the inner end of a threaded bushing 18. The inner part of the cylindrical portion 19 of the bushing 18 is snugly engaged by a bonnet 20 which is screwed into one side of the casing 1. The inner extremity of the bushing 18 is enlarged laterally to form a shoulder 21 which takes against the under surface of a metal washer 38 located in a recess in the inwardly projecting ring flange 22 of the bonnet 20. A ring 39 of flexible packing is interposed between the metal ring 38 and the flange 22.

Interposed between the upwardly extending annular flange part 23 of the bonnet 20 and the cylindrical portion 19 of the bushing 18 are a packing 24 and a gland ring 25. By turning the nut 26 which is threaded onto the bushing 18 the gland ring 25 is forced against and compresses the packing 24. The bushing 18 is thereby firmly held in the bonnet 20, so that when the handle 15 is turned the valve stem 14 travels axially in the bushing.

Extending inwardly from the bushing 18 and loosely engaging the valve stem 14 is a ring flange or shelf 27 which forms the lower end of a space adapted to receive a packing 28 and a gland ring 29. A cap 30 provided with a central hole through which passes the valve stem 14 screws down onto the outer end of the bushing 18 and thereby forces the gland ring 29 against and compresses the packing 28.

The valve stem 14 is bored axially to constitute a chamber 31 which extends at 32 into the body portion of the plug 11. The outer end of the reservoir 31 is threaded to receive a compression screw 33. A check valve 34 of usual construction located in the outer end of the reservoir prevents backflow of the lubricant or abrasive substance past the threads of the screw 33. The plug 11 is provided with one or more radial holes 35 (preferably four) which extend from the inner end 32 of the reservoir to the annular groove 13, so that when the reservoir 31 has been filled with a plastic substance and the screw 33 is turned, the plastic substance will be forced out through the radial holes 35 and into the groove 13 lifting the plug slightly from its seat. By rotating the plug against its seat, as presently described, the plastic substance oozing from the two grooves 13 and 10 will be smeared over the bearing surfaces.

The globe valve described above is opened and closed in the usual manner: By turning the handle 15 in a counter-clockwise direction the plug 11 is lifted from its seat, thereby opening the valve. By turning the handle 15 in a clockwise direction the plug 11 is forced against its seat 9, thereby closing the valve.

If the valve should develop a leak in the bearing surfaces between the plug 11 and its seat 9, the bearing surfaces between these parts may be reground to make a tight joint between them, while the valve is in use and under pressure, in the following manner:— By loosening the nut 26 slightly the bushing 18 is made free to rotate with the valve stem 14. Consequently when a wrench is applied to the cap 30 and is turned in a clockwise direction, the bushing and valve stem are rotated and the plug 11 is rotated against its seat 9 without being lifted therefrom. The grinding material may consist of a mixture of lubricant and fine emery or carborundum which has been introduced into the reservoir 31. By turning the screw 33 the grinding mixture is forced out into the groove 13 and slightly lifts the plug from its seat, the packing ring 39 yielding sufficiently for this purpose, so that as the plug 11 is rotated against its seat the grinding mixture is smeared over the contacting surfaces. By turning the cap 30 in a clockwise direction a fluid and liquid tight joint is soon made between the plug 11 and its seat 9. Giving the screw 33 a further turn causes the mixture of lubricant and abrasive substance to be forced into the joint between the plug and its seat to seal it.

Loosening the gland nut 26 does not permit the valve to leak because the upper surface of the annular shoulder 21 is ground and is engaged by the smooth under surface of the metal washer 38, and between the upper surface of the washer 38 and the under surface of the annular flange 32 is interposed the flexible packing 39. These parts constitute a tight joint which permits rotation of the bushing 18 without leakage. If at any time it is necessary to renew the packing 28 this may be done by opening the valve completely so that the lip portion 36 formed on the inner end of the bushing 18 will tightly engage the fillet 37 formed at the joint between the inner end of the valve stem and the outer surface of the plug 11. The engagement of these parts forms a tight joint preventing leakage when the cap 30 is loosened and the gland ring 29 is removed.

Having thus described the invention what I claim as new is:—

1. A valve comprising a casing having an annular valve seat therein, a plug adapted to be seated against the valve seat, a valve stem connected with the plug and extending outwardly through the casing, said stem having a threaded part, a threaded bushing engaging the threaded part of the stem, an annular shoulder on the bushing, a bonnet secured to the casing and surrounding the bushing, a flexible ring between the shoulder and the bonnet, a reservoir for containing a plastic grinding mixture located in the stem and extending into the plug, said plug having a hole extending from the reservoir to the bearing surface of the plug, means for putting the plastic grinding mixture under pressure to force it out through the hole in the plug and thereby slightly separate the bearing surfaces of the plug and valve seat, a packing interposed between the bushing and the bonnet, a nut threaded on the bushing for putting the packing under pressure to prevent relative movement between the bushing and the bonnet, and means for rotating the bushing and valve stem to rotate the plug against the valve seat when the nut has been turned to permit relative movement between the bushing and the bonnet.

2. A valve comprising, a casing having an annular valve seat therein, a plug adapted to be seated against the valve seat, a stem extending from the plug outwardly through the casing and having a threaded part, a threaded bushing surrounding the valve stem, a bonnet secured to the casing, said bonnet and bushing having overlapping parts, a flexible ring interposed between the overlapping parts of the bonnet and the bushing, a reservoir for containing a plastic grinding mixture located in the valve stem and extending into the plug, said plug having a hole extending from the reservoir to the bearing surface of the plug, means for putting the plastic substance under pressure to force it out through the hole and thereby slightly separate the bearing surfaces of the plug and valve seat, a packing interposed between the bushing and the bonnet, a nut threaded on the bushing for putting the packing under pressure and thereby holding the bushing and the bonnet against relative movement, and means for rotating the bushing and valve stem to rotate the plug against its seat when the nut has been turned to permit relative movement between the bushing and the bonnet.

3. A valve comprising, a casing having an annular valve seat therein, a hollow plug adapted to be seated against the valve seat, a valve stem connected with the plug and extending outwardly through the casing, said stem having a threaded part, a threaded bushing engaging the threaded part of the stem, a bonnet secured to the casing and surrounding the bushing, said stem being hollowed to constitute a reservoir for containing a plastic grinding mixture, said reservoir being connected with the interior of the plug, the plug being provided with apertures extending from its interior to its bearing surface, means for putting the plastic grinding mixture under pressure to force it out through the apertures, means comprising a movable member for normally preventing relative movement between the bushing and the bonnet, and means for rotating the bushing and valve stem to rotate the plug against the valve seat when relative movement is permitted between the bushing and the bonnet.

SVEN JOHAN NORDSTROM.